United States Patent [19]

Kantner et al.

[11] Patent Number: 5,292,990
[45] Date of Patent: Mar. 8, 1994

[54] ZEOLITE COMPOSITION FOR USE IN OLEFINIC SEPARATIONS

[75] Inventors: Edward Kantner, East Brunswick; David W. Savage, Lebanon; Richard J. Bellows, Hampton, all of N.J.

[73] Assignee: Exxon Research & Engineering Co., Florham Park, N.J.

[21] Appl. No.: 625,337

[22] Filed: Dec. 10, 1990

Related U.S. Application Data

[63] Continuation-in-part of Ser. No. 524,949, May 18, 1990, abandoned, which is a continuation-in-part of Ser. No. 281,311, Dec. 7, 1988, abandoned.

[51] Int. Cl.$^5$ .............................................. C07C 7/12
[52] U.S. Cl. .................................... 585/820; 585/826; 208/3102; 423/714
[58] Field of Search ............ 208/310Z; 585/820, 826; 423/714

[56] References Cited

U.S. PATENT DOCUMENTS

| | | | |
|---|---|---|---|
| 2,921,970 | 4/1957 | Gilmore | 208/310Z |
| 3,106,593 | 10/1963 | Benesi et al. | 585/820 |
| 3,717,572 | 2/1973 | de Gramont et al. | 502/85 |
| 3,836,561 | 9/1974 | Young | 502/85 |
| 3,878,129 | 4/1975 | Rosback | 502/85 |
| 4,036,744 | 7/1977 | Rosback et al. | 208/310Z |
| 4,048,111 | 9/1977 | Rosback et al. | 502/64 |
| 4,309,281 | 1/1982 | Dessau | 208/310Z |
| 4,394,254 | 7/1983 | Lewis et al. | 208/310Z |
| 4,517,402 | 5/1985 | Dessau | 208/310Z |
| 4,650,917 | 3/1987 | Dessau et al. | 585/829 |

Primary Examiner—R. Bruce Breneman
Attorney, Agent, or Firm—Joseph J. Dvorak

[57] ABSTRACT

Basically, the present invention is predicated on the discovery that zeolites that have a high silica to alumina ratio, e.g., a ratio of 20 and above, pore diameters of greater than about 5.0Å, and which have substantially no active acid sites, i.e., zeolites which are non-reactive toward olefin isomerization and oligomerization, are especially useful in substantially separating linear olefins and paraffins from hydrocarbon mixtures containing at least linear and branched aliphatic hydrocarbons and optionally containing aromatic and other hydrocarbons.

11 Claims, 4 Drawing Sheets

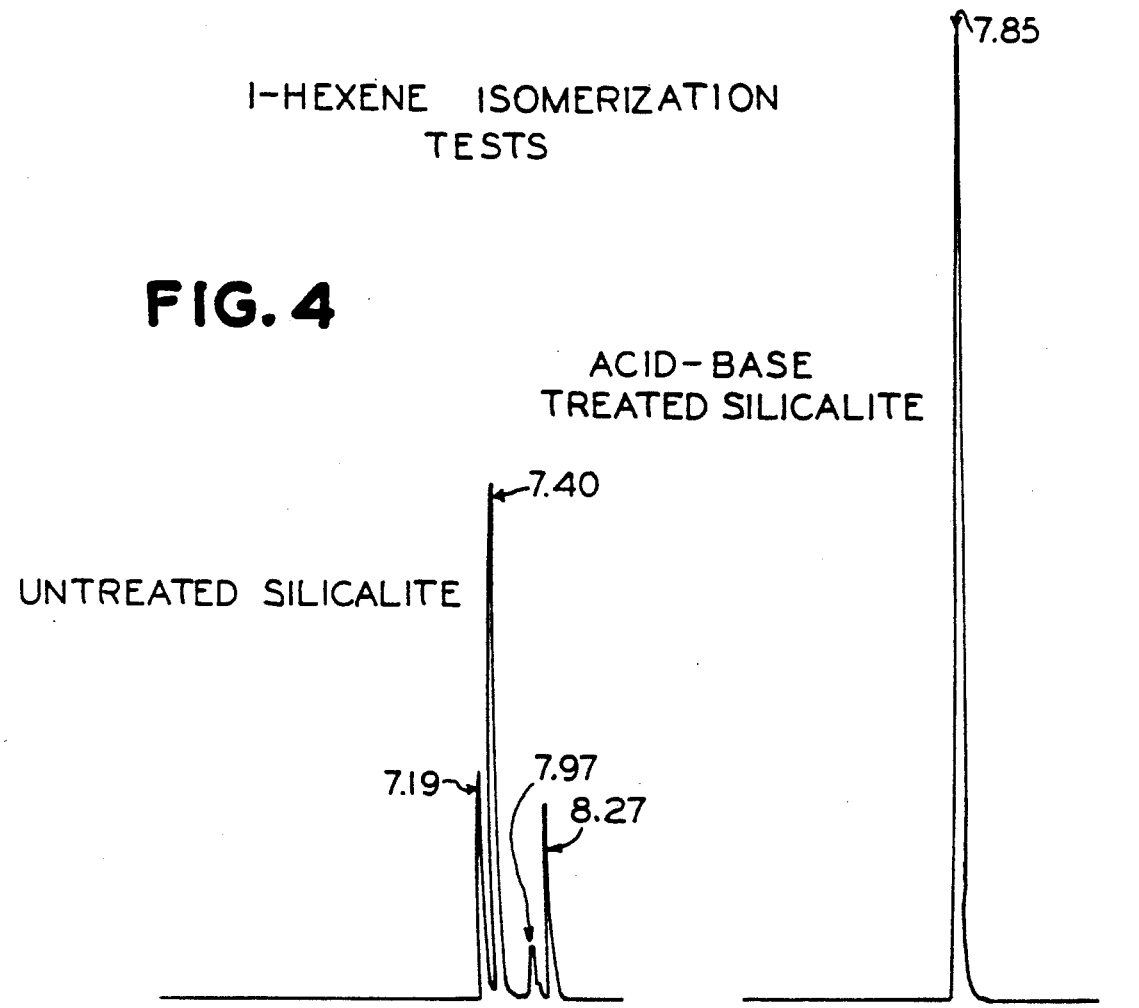

ZEOLITE COMPOSITION FOR USE IN OLEFINIC SEPARATIONS

This application is a continuation-in-part of application Ser. No. 524,949, filed May 18, 1990, now abandoned, which in turn is a continuation of application Ser. No. 281,311, filed Dec. 3, 1988, now abandoned.

FIELD OF THE INVENTION

The present invention is concerned with the preferential adsorption of linear olefins and paraffins from mixtures containing at least linear and branched aliphatic hydrocarbons. Indeed, the present invention is particularly concerned with treating a mixture of hydrocarbons, under adsorption conditions, with a molecular sieve which is capable of substantially adsorbing the linear olefins and linear paraffins in the mixture without substantially isomerizing the olefins therein and thereafter desorbing the molecular sieve, under desorption conditions, to obtain a mixture containing substantially linear olefins and paraffins. The present invention also is concerned with improved zeolite compositions suitable for separation of linear olefins and paraffins from hydrocarbon mixtures containing at least branched olefins.

PRIOR ART VERSUS THE PRESENT INVENTION

Selective adsorption of hydrocarbons by molecular sieves has been known for more than 25 years. The selective adsorption of n-paraffins by molecular sieves is a widely employed commercial method of separation.

The early molecular sieve adsorbents were crystalline aluminosilicates, commonly known as zeolites. During the last ten years, however, similar crystalline sieve compounds of different chemical compositions have been synthesized and used as adsorbents. These include aluminophosphates and a microporous crystalline silica, silicalite. All these shape selective adsorbent compounds are broadly referred to herein as zeolites.

The early aluminosilicate zeolites were mostly active as catalysts, due to their polar, acidic character. They led to olefin isomerization, dimerization, alkylation and cracking reactions. Nevertheless, they were often disclosed as adsorbents for separations applicable in refinery processes where selectivities and the absence of side reactions were less critical. Indeed, most of the prior patents were aimed at the separation of n-paraffins.

Eberly and Webb described in U.S. Pat. No. 3,485,748 the separation of normal and branched chain paraffins and olefins from aromatic hydrocarbons, using an acid treated mordenite having an $SiO_2/Al_2O_3$ molar ratio above 25.

A number of patents assigned to Mobil Oil Corporation disclose the use of ZSM-5 and related zeolites for the separation of normal paraffins. Gorring and Shipmen described in U.S. Pat. Nos. 3,894,938 and 3,980,550 the catalytic hydrodewaxing of gas oil using multivalent transition metal derivatives of ZSM-5 and the like. This process for the production of lubricating oils of reduced pour point was improved by Garwood and Caesar. They disclose in U.S. Pat. No. 4,149,960 that the addition of water to the gas oil feed reduces coke formation. U.S. Pat. No. 4,517,402 by Dessau disclosed a process for the selective separation of linear aliphatic compounds with ZSM-11. Dessau shows the separation of n-paraffins from branched paraffins and aromatics and the separation of n-olefins from branched olefins; however, he neither shows nor suggests the separation of an n-paraffin and n-olefin mixture from a feed containing both aliphatic and aromatic hydrocarbons.

U.S. Pat. No. 4,619,758 by Pratt, Sayles, Bowers and Scott discloses the selective adsorption of n-paraffins by zeolites such as ZSM-5, from hydrocarbon mixtures; for example, vacuum gas oil, followed by cracking of said n-paraffins in the zeolite.

U.S. Pat. No. 3,969,223 by Rosback and Neuzil discloses the separation of olefins from olefin-paraffins mixtures, such as cracked wax by an X zeolite with an amorphous binder previously treated by aqueous sodium hydroxide to increase its sodium cation concentration. The treatment resulted in less olefin dimerization during the separation; however, this large pore diameter zeolite could not be used to separate straight chain and branched chain compounds.

Neuzil and Kulprathipanja were the first to disclose, in U.S. Pat. No. 4,455,445, column 1, lines 25 to 32, "that silicalite is able to effect the separation of normal $C_4$ hydrocarbons from isobutylene with substantially complete elimination of the aforementioned undesired side effects of olefin dimerization and polymerization, particularly when pentene-1 is used to displace the normal $C_4$ hydrocarbons from the zeolite." Neuzil et al aimed their process for the separation of isobutene from $C_4$ hydrocarbons, since isobutylene is useful, e.g., as a gasoline blending agent and as an ionomer for the production of polyisobutylene. They neither disclosed nor suggested this separation for the production of useful mixtures of higher n-olefins and n-paraffins.

Kulprathipanja and Neuzil also disclosed in U.S. Pat. No. 4,486,618 the adsorption of normal $C_6$ olefins from cyclic and branched $C_6$ olefins using a silicalite with alumina as a binder. 1-Pentene or 1-butene were used for desorption. 1-Octene could never completely displace 1-hexene. In U.S. Pat. No. 4,433,195, Kulprathipanja disclosed the separation of a trans-olefin from a cis-olefin via selective adsorption by a silicalite. As an example, he described the adsorption of trans-2-butene from a mixture of cis- and trans-2-butenes followed by desorption with 1-pentene.

U.S. Pat. No. 4,455,444 by Kulprath Neuzil disclosed the selective adsorption of n-paraffins in silicalite and their desorption by n-olefins, particularly 1-hexene. However, this patent emphasized that the feeds are limited to hydrocarbons containing little or no olefins. The disclosures of the parent patent by Kulprathipanja and Neuzil, i.e., U.S. Pat. No. 4,367,364, were also limited to selective n-paraffin adsorption in silicalites in the presence of little or no olefins. Additionally, the process of this patent and the process of the above discussed subsequent patents by the same inventors were limited to hydrocarbon feeds containing cyclic hydrocarbons having more than six carbons. This excludes benzene, which can enter the pores of the silicalite.

Overall, the disclosures of the Kulprathipanja and Neuzil patents suggest that all the work was carried out with silicalite plus alumina binder compositions. The results were probably affected by the presence of the acidic alumina, even though the Si/Al ratios were above 12, as stated in U.S. Pat. No. 4,486,618.

Some of the fundamental information disclosed in the Kulprathipanja and Neuzil patents was previously published in an article announcing the discovery of silicalite: A research group of the Union Carbide Corporation and J. V. Smith of the University of Chicago reported, in volume 271, pages 512 to 516 of Nature, the synthesis, structure and generic adsorption properties of silicalite in 1978. Silicalite was patented in 1977 as a novel composition of matter in U.S. Pat. No. 4,061,724 by R. W. Grose and E. M. Flanigen, assigned to Union Carbide. A more recent publication of this composition by Y. H. Ma and Y. S. Lin appeared as paper No. 68h-21 in the preprints of the 1984 Annual Meeting in San Francisco of the American Institute of Chemical Engineers. It was found that the equilibrium adsorption capacity of silicalite for the investigated hydrocarbon in n-hexene solution decreases in the following order: 1-heptene>cyclohexene >benzene>cyclohexane>n-octane and the presence of alumina binder affected the adsorption in most cases.

Notwithstanding the foregoing references, there still remains a need for separating linear olefins and paraffins from mixtures containing linear and branched aliphatic hydrocarbons, and especially from mixtures also including aromatic hydrocarbons. For example, high temperature thermal cracking of petroleum residua provides distillates that contain linear and branched olefins and paraffins, as well as aromatic and other hydrocarbons. The separation of linear olefins from these mixtures is particularly desirable because the linear olefins are especially useful in the synthesis of high-value added polymers and other products. Therefore, it is an object of the present invention to provide improvements in separating linear olefins from mixtures of hydrocarbons, including branched aliphatic hydrocarbons and aromatic hydrocarbons. Additionally, it is an object of the present invention to provide an improved zeolite for use in separation of linear olefins from hydrocarbon mixtures. These and other objects of the invention will become apparent upon a reading of the balance of the specification.

SUMMARY OF THE INVENTION

Basically, the present invention is predicated on the discovery that zeolites that have a high silica to alumina ratio, e.g., a ratio of 50 and above, with pore diameters of greater than about 5.0Å, and which have substantially no active acid sites, i.e., zeolites which are non-reactive toward olefin isomerization and oligomerization under adsorption and desorption conditions, are especially useful in substantially separating linear olefins and paraffins from hydrocarbon mixtures containing at least linear and branched aliphatic hydrocarbons and optionally containing aromatic and other hydrocarbons.

Thus, in one embodiment of the present invention, there is provided a zeolite composition which is substantially non-reactive toward olefin isomerization and useful in olefin separations, comprising a zeolite prepared by treating a zeolite molecular sieve having a silica to alumina ratio of greater than about 50, with internal pore diameters of greater than about 5.0Å with an acid to remove at least some of the acid soluble impurities in the zeolite and then with sufficient base to remove residual acidity from the zeolite.

In another embodiment of the invention, a process for separating linear olefins and paraffins from mixtures containing at least linear and branched aliphatic hydrocarbons is provided and comprises: contacting the mixture with a zeolite molecular sieve having internal pore diameters of greater than about 5.0Å, a silica to alumina ratio greater than about 50 and which is substantially non-reactive toward olefin isomerization and oligomerization under adsorption and desorption conditions. The contacting is conducted under conditions sufficient to effect adsorption of linear olefins and paraffins to the substantial exclusion of branched hydrocarbons, and aromatic and other hydrocarbons when present in the mixture, thereby substantially separating the linear olefins and paraffins from the mixture.

BRIEF DESCRIPTION OF THE FIGURES

FIG. 4 shows how untreated silicalite isomerizes 1-hexene as compared to acid-base treated silicalite, which leaves the 1-hexene unreacted. This figure is explained in detail in Example 13.

FIG. 5 shows how said washed silicalite, when neutralized with gaseous ammonia, was equally effective in leaving 1-hexene unreacted.

DETAILED DESCRIPTION OF THE INVENTION

Figure 1:
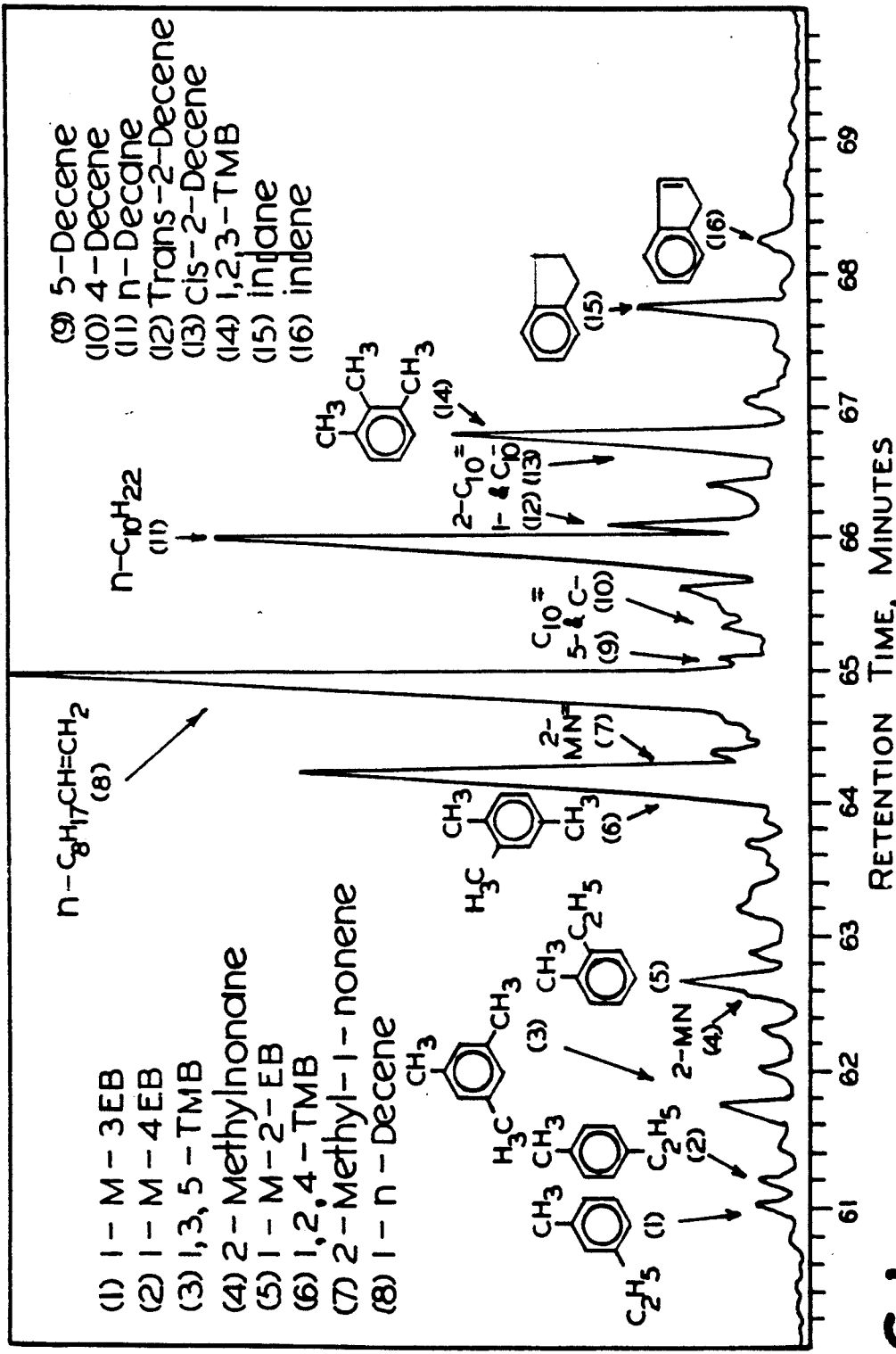
FIG. 1 illustrates the capillary gas chromatogram of a sharp $C_{10}$ FLEXICOKER distillate fraction, which was most frequently used as a feed for zeolite separations.

The invention will be described with particular reference to the separation of linear olefins and paraffins from distillate feeds produced from high temperature thermal cracking processes because of the economic, commercial and technical importance of obtaining valuable products from a relatively low value feed. It will be appreciated, however, that the invention is useful in separating linear olefins and paraffins from other hydrocarbon feeds containing branched aliphatic hydrocarbons in mixtures with linear compounds, and possibly including aromatic compounds.

Additionally, for convenience, a description of a suitable hydrocarbon feed for separation, the zeolite adsorbents used, the conditions of adsorption and the conditions of desorption will be addressed in the separate sections which follow.

Hydrocarbon Feed

As stated above, the process of the present invention is particularly useful in separating linear olefins and linear paraffins from distillates obtained from thermal cracking of petroleum residua. U.S. Pat. No. 4,711,968 describes a representative cracking process that produces a hydrocarbon feed containing a mixture of linear and branched olefins and paraffins, as well as aromatic hydrocarbons suitable for upgrading as described herein.

Distillates from such thermal cracking processes having hydrocarbons ranging from $C_5$ to $C_{19}$ contain olefin compounds in concentrations generally exceeding about 10 wt. %, and typically from about 20 wt. % to about 30 wt. %. In these distillates, the linear olefins generally are the major olefin component. Also, the largest single type of olefin present generally is Type I, of the formula $RCH=CH_2$. A typical distribution range for the various olefins present in such distillate is given below.

| RCH=CH₂ | RCH=CHR | R₂C=CH₂ | R₂C=CHR | R₂C=CR₂ |
|---|---|---|---|---|
| Type I | Type II | Type III | Type IV | Type V |
| 25-45% | 15-25% | 10-20% | 10-20% | Not indicated |

R = alkyl groups (linear or branched)

The paraffin components in these distillates are generally in concentrations similar to or lower than those of the olefins, with the linear paraffins being the major paraffin component.

The aromatic hydrocarbon components generally represent from about 1 to about 60 wt. % of these hydrocarbon mixtures and, more typically, from about 10 to 60 wt. %. The aromatic hydrocarbons present include both unsubstituted or substituted aromatic compounds. The substituents tend to be short $C_1$ to $C_3$ alkyl groups.

Generally, sulfur compounds are present as impurities in these hydrocarbon mixtures. The present process is capable of separating linear olefins and paraffins from feeds containing a relatively high sulfur content; e.g., from 0.05 wt. % or above.

Zeolite Adsorbents

The zeolite adsorbents of the present process are molecular sieves which include not only crystalline aluminosilicates, but aluminophosphates, silicalite and similar microporous crystalline materials. These zeolites possess either an internal pore system comprised of interconnected cage-like voids or a system of one, two or three dimensional channels.

Importantly, the preferred zeolite adsorbents of the present invention possess pore diameters greater than 5Å and generally ranging from about 5.1Å to about 5.7Å. Zeolites of this pore diameter range from chabazite to ZSM-5 and silicalite.

Another important characteristic of the preferred zeolites is their high silica to alumina ratio. In general, the preferred zeolites have a silica to alumina ratio above 50 and more preferably above 100, such as ZSM-5, ZSM-11, ZSM-12 and silicalite. U.S. Pat. No. 3,702,886 describes ZSM-5. U.S. Pat. No. 3,709,979 describes ZSM-12; and U.S. Pat. No. 3,832,449 describes ZSM-11.

Most importantly, the zeolite adsorbents of the present invention are characterized as having substantially no active acid sites; i.e., they must not catalytically promote significant olefin isomerization and oligomerization under adsorption and desorption conditions. In accordance with the present invention, zeolites that have active acid sites can be rendered suitable for use in separating linear olefins from branched aliphatic hydrocarbons by treating the zeolite with sufficient acid to dissolve at least some of the acid soluble impurities in the zeolite, and thereafter treating the acid treated zeolite with a base to neutralize the zeolite. Indeed, it is especially preferred to use a sufficient excess of acid to dissolve substantially all of the acid soluble impurities present in the zeolite.

In the practice of the present invention, the preferred zeolite adsorbents are silicalites, which topologically resemble ZSM-5 and contain the same type of building unit. One commercially available silicalite, S-115 sold by Union Carbide Corporation, has a high silica to alumina ratio, and two sets of intersecting channels having pore sizes ranging from 5.2Å to 5.7Å in diameter.

This material contains significant amounts, about 0.5%, of aluminum as $Al_2O_3$, which can be lowered by acid treatment. The resulting low alumina (about 0.3% Al) silicalite is then treated with a base to neutralize and remove acid impurities contained within the molecular structure of the zeolite, rendering it particularly useful in the practice of the present invention.

The crystalline zeolite adsorbents are usually formed into spheres or cylindrical pellets which have high mechanical attrition resistance. This is achieved using binders which do not seriously hinder diffusion in the micropores. Silica, alumina and cross-linked organic polymers can be employed as binders.

Adsorption

The adsorption is conducted by contacting the hydrocarbon feed and the zeolite at a temperature wherein the molecules to be adsorbed have a sufficient energy to overcome the repulsive interaction with the zeolite and pass through the aperture of the zeolite channels and reversibly fill the micropores. To achieve sufficient adsorbate diffusion rates, increased temperatures are needed to overcome the activation energy requirements of molecules of increasing size and/or molecular weight.

Generally, preferred adsorption temperatures are in the 10° C. to 250° C. range. Adsorption of the low molecular weight feeds, e.g., $C_5$ to $C_8$ distillates, can be carried out at low temperatures, in the 10° C. to 100° C. regime. The adsorption of $C_9$ to $C_{19}$ fractions at optimum diffusion rates requires increasing temperatures, ranging from 100° C. to 200° C. The choice of adsorption temperature will depend on a number of factors such as the carbon range of the hydrocarbon feed and the effect that high temperatures may have in promoting isomerization of the linear olefins, cracking of the feed or other undesired side reactions. Broad distillate feed cuts generally are processed at temperatures higher than warranted for their low boiling components.

Gas phase adsorption is carried out preferably at close to atmospheric pressures in a temperature range wherein the feed is in the gaseous state. Similarly, liquid phase adsorption is performed at temperatures where the feed is liquid. When processing a volatile feed, such as one containing $C_5$ hydrocarbons, in the liquid phase, above atmospheric pressure may be used. In general, a liquid phase operation is preferred because it can be usually carried out at a lower temperature providing a higher extract yield.

Desorption

Desorption, i.e., the removal of the n-olefin and n-paraffin rich extract from the zeolite adsorbent, can be carried out under varying conditions as part of the adsorption-desorption cycle. A thermal swing cycle comprises desorption at a temperature higher than that for the adsorption. Similarly, a pressure swing cycle employs reduced pressure to effect desorption. An isothermal purge cycle employs a non-adsorbed liquid to strip the adsorbate from the voids and eventually from the pores of the zeolite. Finally, the displacement purge cycle employs a desorbent which is equally or more strongly adsorbed than the adsorbate. This desorbent is then displaced by the adsorbate in the adsorption cycle.

The preferred desorption is part of a displacement purge cycle. This cycle is preferably practiced as out-lined by D. B. Broughton in U.S. Pat. No. 2,985,589 and a paper entitled "Continuous Adsorptive Processing-A New Separation Technique", presented at the 34th Annual Meeting of the Society of Chemical Engineers at Tokyo, Japan on April 2, 1969, which are incorporated hereby by reference. Broughton particularly described a simulated moving bed countercurrent process flow scheme preferred in the process of the present invention.

In general, a variety of compounds such as steam, $CO_2$, $NH_3$, methane, butane, and butene can be used in the desorption step. Indeed, the ability to use steam as a desorbent is quite surprising and especially preferred. In the case of $NH_3$ being used in the desorption step, the zeolite is regenerated to its previous state of the acid-base treated zeolite which was used in the adsorption step. However, except in the cases of steam and $NH_3$, for a preferred operation in the liquid phase using the displacement purge cycle, n-paraffins and/or n-olefins, particularly 1-n-olefins are the choice desorbents. These preferred desorbents are liquids which are lower boiling than the feed. In a preferred operation, the boiling point of the desorbent should be low enough for easy separation from the feed by distillation, but high enough so as to assure that the specific gravity and viscosity of the feed are not drastically different from that of the feed. The latter facilitates smooth feed and extract displacement by liquid flow through the adsorbent bed.

Exemplary hydrocarbon desorbing agents include n-pentane for a $C_6$ feed, 1-hexene for a $C_7$ to $C_9$ feed, 1-n-octene for a $C_9$ to $C_{13}$ feed. In contrast to the prior art, 1-n-octene is a preferred hydrocarbon desorbent in the present process. Even though 1-n-octene may not be completely separated from the 1-n-olefin n-paraffin rich extract, its presence is not objectionable in the subsequent conversions of the olefin components.

In an alternate operation, a broad feed fraction, such as $C_8$ to $C_{15}$, is employed and the low boiling part of the extract, e.g., a mixture of $C_8$, $C_9$ n-olefins and n-paraffins, is used as a desorbent. In such an operation, the low boiling components of the extract are distilled and used as desorbents.

The broad temperature range of desorption is generally the same as that of the adsorption. In the isothermal or nearly isothermal process cycles, such as the preferred displacement-purge cycle and the stripping cycle, the preferred temperature ranges for desorption and adsorption are similar by definition.

With the exception of the pressure swing cycle, the pressure ranges of adsorption and desorption are generally similar. Close to atmospheric cycles are preferred. In a preferred liquid phase cycle, the use of a low boiling desorbent such as n-butane may require superatmospheric pressure.

Adsorption-desorption cycles of the present process are operated in a temperature regime where no significant olefin side reactions take place. Nevertheless, the zeolite adsorbents have finite lifetimes due to minor side reactions resulting in pore plugging. Regeneration of the thus deactivated zeolite is generally possible by calcination which results in the burning off of organic impurities.

Conversion

The olefin components of n-olefin plus n-paraffin mixtures obtained in the present separation process are advantageously converted to higher boiling derivatives and then separated from the unreacted n-paraffins. These conversions generally comprise known chemical reactions and processes. The preferred conversions are oligomerization, alkylation of aromatics and carbonylation.

EXAMPLES

The following examples are provided to illustrate the presently claimed process, but are not intended to limit the scope of the invention. Most of the Examples describe the novel selective adsorption in zeolites, particularly silicalite and the sodium form of ZSM-5, of n-olefin and n-paraffin mixtures. Adsorption studies of feeds consisting of model compounds and 1-n-olefin rich cracked distillates derived from petroleum residua will be presented side by side. The desorption step of the present adsorptive, molecular sieve process will be also illustrated. Finally, an example will be given for the conversion of the olefin components of an n-olefin plus n-paraffin rich product of the present separation process.

Prior to the specific examples, the cracked distillate feed employed and the zeolite adsorbents used will be described. The test methods and analytical techniques, i.e., the gas and liquid phase standard static adsorption tests, and raffinate analysis by capillary gas chromatography, will be discussed.

Feeds, Test Methods and Analyses

The model compound mixtures employed as feeds in the adsorption tests were made up from pure laboratory chemicals representing the main types of compounds present in the feeds of the present separation process.

Other feed fractions examined in detail were FLEXICOKER distillates produced by cracking vacuum residua of mixed crudes of South American and Mideastern origin. Fluid-coker distillates similarly derived from Northwest American crude had similar molecular compositions. Such distillates are described in detail in the earlier referred patent, U.S. Pat. No. 4,711,968.

The zeolite adsorbents were calcined before use by heating at about 400° C. overnight. Thereafter, they were stored at 80° C. under nitrogen until used.

A low alumina (less than 200 ppm) microcrystalline silicalite, i.e., one having substantially inactive acid sites, was also employed.

The high alumina (about 5000 ppm) silicalite powder from Union Carbide Corporation was treated at room temperature at first with an 18% aqueous hydrochloric acid solution overnight 3-4 times, until the supernatant liquid was no longer discolored. Thereafter, the silicalite was treated with a dilute aqueous sodium hydroxide solution of pH 9-10 overnight or with an ammonia gas. These treatments resulted in a significant reduction of its alumina content and the neutralization of acidic impurities. The silicalite resulting from this acid-base treatment was calcined as usual.

A laboratory preparation of ZSM-5 sodium aluminosilicate derivative derived from the corresponding quaternary ammonium derivative was also used. The microcrystalline powder was also calcined and employed in some of the adsorption tests. Sodium ZSM-5, made via direct synthesis by Uetikon of Switzerland was also tested.

The model compound mixtures and FLEXICOKER distillate fractions employed as feeds in the adsorption tests and their respective raffinates, i.e., non-adsorbed products of these tests, were analyzed by capillary gas chromatography (GC). High resolution GC analyses were carried out using a 50 m fused silica column coated with non-polar methylsilicones. Thus, GC retention times were approximately proportional to the boiling points of the components.

In general, the adsorption tests were carried out with accurately weighed amounts of zeolite and hydrocarbon feed. After contacting the zeolite and the feed, the composition of the rejected hydrocarbon raffinate was analyzed and compared with that of the feed.

Static adsorption tests were carried out in both the gas and the liquid phase, using model compound mixtures and FLEXICOKER fractions of varying carbon ranges. In the gas phase test, about 1 g zeolite and 0.2 g hydrocarbon feed were placed into a small closed vial and kept there for four hours at 40° C. With the low, $C_5$ and $C_6$, fractions used in these tests, this was sufficient to reach adsorption and gas liquid equilibria. Thereafter, the gas phase of the test mixture representing the raffinate and the feed were both sampled for GC analyses.

In the liquid phase tests, the hydrocarbon feed was diluted with a non-adsorbing bulky compound, heptamethylnonane or decalin. In the majority of liquid phase tests, 2 g of a 10/90 mixture of hydrocarbon and diluent was used per g zeolite. This proportion of the liquids to solids gave rise to a substantial supernatant liquid phase of the test mixture which could be easily sampled. The test mixture was heated for several hours with occasional shaking to reach equilibrium and then allowed to cool. The supernatant liquid was then analyzed by GC and its composition was compared with that of the feed.

Some of the liquid phase tests were carried out with about 1 g of a 30/70 mixture of the feed, plus diluent per g zeolite. These mixtures exhibited no significant supernatent liquid phase after settling. The sealed mixtures were heated to reach equilibria as above. Due to the absence of a separate liquid phase, the equilibria were more rapidly established in these tests. After equilibriation, the test mixtures were diluted with about 1 g of isooctane, 2,3,4-trimethylpentane, or other suitable bulky compound and thoroughly mixed. After settling, the clear supernatant liquid phase was analyzed by GC as usual.

It is noted that the absence of zeolite microcrystals from the liquids injected to the gas chromatograph is critical for correct compositional analyses of the raffinates. These crystals, if present, are deposited in the high temperature (about 325° C.) injection port of the chromatograph and act as cracking catalysts particularly for the 1-n-olefin components.

The FLEXICOKER distillate feeds exhibited complex gas chromatograms with overlapping GC peaks of some components, especially in case of the higher fractions. As a consequence, the nominal GC percentages of some small components were dependent on the GC sample size.

The selectivities and capacities of zeolite adsorbents for the components of the test mixtures were estimated by the ratio of their respective concentrations in the raffinate. High ratios indicated selective adsorption, while low ratios were signs of rejection by the zeolite.

EXAMPLE 1

Preparation of Acid-Base Treated Silicalite

One liter of 18% by wt. hydrochloric acid, at room temperature, was added to 20 g silicalite (S-115 from Union Carbide Corporation) with stirring. The liquid-solid suspension was allowed to settle overnight to separate into two phases. The supernatant liquid phase, which had become discolored, was decanted and 1 liter of fresh 18% HCl was added to the solid with stirring and again allowed to settle overnight. This acid washing procedure was repeated a third time, after which the liquid phase remained colorless. The silicalite was collected and washed repeatedly with deionized water until the wash water gave a neutral reaction to litmus. The silicalite was then washed in 1 liter of a mildly basic solution which was prepared by adding 0.3 g NaOH to 1 liter of water, again allowed to settle, and finally rinsed once with deionized water. The silicalite was dried in air overnight at 90°-95° C. and calcined at 400° C. for a minimum of 4 hours, at which time it was ready for use.

An alternate method to neutralize the residual acid sites in the silicalite was to dry it at 90°-95° C. overnight, following the acid washing and water rinsing as described above. The silicalite was then placed in an evacuated vessel which had been filled with 1 wt. %-2 wt. % anhydrous ammonia, the percentage being based on the weight of silicalite to be so treated. The silicalite was spread out in the evacuated vessel to maximize the surface area in contact with the gaseous ammonia, and contact time was 1 hour. The silicalite was collected and it was ready for use.

EXAMPLE 2

Adsorption of n-Pentenes and n-Pentane from $C_5$ FLEXICOKER Naphtha

A sealed mixture of about 0.2 g $C_5$ FLEXICOKER feed fraction and 1 g acid base treated silicalite of Example 1 was heated at 40° C. for 4 hours. Subsequent gas phase analyses of the feed and the raffinate (Raf.) by GC indicated the percentage composition listed in Table I. (The main components are listed in the order of their retention times.)

The date of Table I show that the concentrations of 1-n-pentene, cis- and trans-pentenes and n-pentane are significantly reduced in the raffinate, indicating their selective adsorption. In contrast, the concentrations of methyl branched butenes and isopentane (2-methylbutane) are increasing in the raffinate, indicating their rejection.

EXAMPLE 3

Adsorption of n-Hexenes and n-Hexane from a Mixture of $C_6$ Model Compounds

About 0.2 g of a mixture of similar amounts of n-hexenes, n-hexane and 2-methylpentane and g acid/base washed silicalite of Example 1 were contacted at 40° C. for 4 hours and analyzed by the gas phase method using GC. The compositions of the resulting raffinate and the starting feed are compared in Table II.

The data of Table II indicate that with the exception of cis-2-hexene, all the n-hexenes plus the n-hexane in the mixture were adsorbed. Trans-2-hexene was preferentially adsorbed over cis-2-hexene.

A rejection of 2-methyl branched 1-pentene was indicated.

Calculations have shown that the approximate capacity of the silicalite for 2-hexenes and 1-hexene was about 4.7 wt. % and 1.9 wt. %, respectively.

TABLE I

Adsorption of C₅ FLEXICOKER Fraction by Acid/Base Treated Silicalite

| Name of Component | Conc., GC % Feed | Conc., GC % Raf. | Ratio, Feed to Raf. |
|---|---|---|---|
| 3-Methyl-1-butene | 4.5 | 9.3 | 0.48 |
| Isopentane | 13.4 | 21.8 | 0.61 |
| 1-n-Pentene | 38.1 | 22.6 | 1.69 |
| 2-Methyl-1-butene | 18.4 | 24.2 | 0.76 |
| n-Pentane | 12.5 | 6.7 | 1.86 |
| Isoprene | 3.1 | 4.5 | 0.69 |
| trans-2-Pentene | 4.9 | 3.1 | 1.58 |
| cis-2-Pentene | 1.8 | 1.3 | 1.38 |
| 2-Methyl-2-butene | 0.8 | 3.2 | 0.25 |

TABLE II

Adsorption of Model Mixture of C₆ Hydrocarbons by Acid/Base Treated Silicalite

| Name of Component | Conc., GC % Feed | Conc., GC % Raf. | Ratio, Feed to Raf. |
|---|---|---|---|
| 2-Methyl-1-pentene | 18.5 | 33.0 | 0.56 |
| 1-n-Hexene | 17.0 | 13.8 | 1.23 |
| n-Hexane | 18.0 | 12.6 | 1.43 |
| trans-2-Hexene | 22.7 | 14.7 | 1.55 |
| cis-2-Hexene | 18.8 | 17.0 | 1.11 |

EXAMPLE 4

Adsorption of n-Hexenes and n-Hexane from C₆ FLEXICOKER Naphtha

A gas phase adsorption test was carried out with a mixture of about 0.2 g broad C₆ FLEXICOKER feed fraction and 1 g acid/base treated silicalite of Example 1 for 4 hours at 40° C. Subsequent GC analyses of the feed and the raffinate obtained are shown in Table III.

The data of the table show that, among the C₅ components, cyclopentene and cyclopentane are not adsorbed. In contrast, cis- and trans-piperylene appear to get adsorbed among the numerous C₆ hydrocarbons, the n-hexenes exhibited the positive adsorption behavior observed in the C₆ model mixture. The methyl branched pentenes did not get appreciably adsorbed, except the 3-methyl branched 2-pentene. Among the C₆ paraffins present, only n-nexane was adsorbed.

Calculations indicated that the approximate capacity of the silicalite for the main two components, 1-n-hexene and n-hexane, was 3.5% and 1.8%, respectively.

TABLE III

Adsorption of C₆ FLEXICOKER Fraction by Acid/Base Treated Silicalite

| Name of Component | Conc., GC % Feed | Conc., GC % Raf. | Ratio, Feed to Raf. |
|---|---|---|---|
| n-Pentane | 2.2 | 0.3 | 7.3 |
| trans-2-Pentene | 1.7 | 0.7 | 2.4 |
| cis-2-Pentene | 1.1 | 0.6 | 1.8 |
| 2-Methyl-2-butene | 3.8 | 7.3 | 0.5 |
| trans-Piperylene | 1.1 | 0.2 | 5.5 |
| cis-Piperylene | 0.8 | 0.2 | 4.0 |
| Cyclopentene | 4.4 | 7.8 | 0.6 |
| Cyclopentane | 3.4 | 6.4 | 0.6 |
| 4-Methyl-1-pentene | 5.8 | 10.4 | 0.6 |
| 2-Methylpentane | 4.5 | 7.2 | 0.6 |
| 4-Methyl-2-pentene | 2.3 | 3.8 | 0.6 |
| 3-Methylpentane | 1.8 | 3.1 | 0.6 |
| 2-Methyl-1-pentene | 3.6 | 5.7 | 0.6[a] |
| 1-n-Hexene | 20.3 | 5.3 | 3.8[a] |
| n-Hexane | 10.1 | 2.2 | 4.6 |

TABLE III-continued

Adsorption of C₆ FLEXICOKER Fraction by Acid/Base Treated Silicalite

| Name of Component | Conc., GC % Feed | Conc., GC % Raf. | Ratio, Feed to Raf. |
|---|---|---|---|
| 3-Hexenes | 1.3 | 0.5 | 2.6 |
| trans-2-Hexene | 3.0 | 0.7 | 4.0[a] |
| 2-Methyl-2-pentene | 2.1 | 3.4 | 0.6 |
| 3-Methyl-2-pentene | 1.5 | 0.5 | 3.0 |
| cis-2-Hexene | 1.2 | 1.8 | 0.7 |
| Methylcyclopentane | 3.5 | 4.7 | 0.7 |
| Benzene | 6.1 | 7.6 | 0.8[a] |

[a]GC peak overlap.

EXAMPLE 5

Adsorption of 1-n-Octene and n-Octane from a Mixture of C₈ Model Compounds

About 2.4 g of 10/90 mixture of C₈ model compounds and heptamethylnonane diluent was added to two 1 g acid/base washed samples of Example 1 to prepare two test mixtures. These mixtures were then heated at 110° C. for 2 hours and at 150° C. for 4 hours. The supernatant liquids of these compositions were then analyzed by GC. The GC compositions of the two C₈ raffinate compositions are compared to that of the feed in Table IV.

The data of the table indicate that 1-n-octene and n-octane are selectively adsorbed from a mixture containing C₇ and C₈ aromatic hydrocarbons at both test temperatures. There is only minor isomerization of 1-octene to internal, i.e., 2-, 3- and 4-octenes. The aromatic sulfur compounds present, 2-methylthiophene and 2,5-dimethylthiophene, are highly selectively adsorbed. The selectivity, as indicated by the ratio of raffinate to feed, is particularly high for the less bulky methylthiophene.

TABLE IV

Adsorption of Model Mixture of C₈ Hydrocarbons by Acid/Base Treated Silicalite

| Name of Component | Feed | Concentration, GC % Raffinate 110° C. | Concentration, GC % Raffinate 150° C. | Ratio of Feed to Raffinate 110° C. | Ratio of Feed to Raffinate 150° C. |
|---|---|---|---|---|---|
| Toluene | 12.7 | 15.3 | 18.1 | 0.8 | 0.7 |
| 2-Methylthiophene | 1.3 | 0.4 | 0.1 | 3.4 | 10.3 |
| 1-n-Octene | 20.2 | 10.8 | 9.7 | 1.9 | 2.1 |
| 4-Octene | 0.1 | 0.1 | 0.1 | ~1.0 | ~1.0 |
| 3-Octene | 0.2 | 0.4 | 0.4 | ~0.5 | ~0.5 |
| n-Octane | 28.7 | 10.6 | 9.4 | 2.7 | 3.0 |
| trans-2-Octene | 0.3 | 0.7 | 0.7 | ~0.4 | ~0.4 |
| cis-2-Octene | 0.2 | 0.9 | 0.6 | ~0.2 | ~0.3 |
| Ethylbenzene | 15.7 | 18.8 | 21.9 | 0.8 | 0.7 |
| 2,5-Dimethylthiophene | 1.5 | 0.7 | 0.3 | 2.2 | 7.7 |
| m- & p-Xylenes | 26.7 | 34.0 | 38.9 | 0.8 | 0.7 |

EXAMPLE 6

Adsorption of 1-n-Octene and n-Octane from C₈ FLEXICOKER Naohtha

A liquid phase adsorption test was carried out with about 2.2 ml of a 10/90 mixture of a C₈ FLEXICOKER distillate and heptamethylnonane and 1 g acid/base washed silicalite of Example 1. The mixture was heated at 110° C. for 2 hours. The supernatant raffinate was analyzed by GC and its composition compared with that of the feed. The results are shown in Table V.

The data indicate 1-n-octene and n-octane are selectively adsorbed. It appears that some of the 1-n-octene was isomerized to internal octenes. 4-Methyl-1-heptene is apparently not adsorbed appreciably because of the branching in the middle of the chain. The dimethyl branched aliphatic hydrocarbons are completely rejected. Similarly, the aromatic hydrocarbons, toluene and ethylbenzene, appear to be rejected.

TABLE V

Adsorption of C$_8$ FLEICOKER Fraction by Acid/Base Washed Silicalite at 110° in 2 Hours

| Name of Component | Component Conc. GC % | | Ratio, Feed to Raf. |
|---|---|---|---|
| | Feed | Raf. | |
| Toluene | 7.2 | 11.8 | 0.6 |
| 4-Methyl-1-heptene | 2.8 | 4.4 | 0.6 — |
| 2-Methylheptane | 4.3 | 2.0 | 2.1 — |
| cis-1,3-Dimethylcyclohexane | 4.5 | 6.5 | 0.7 — |
| 2-Methyl-1-heptene(a) | 6.1 | 1.8 | 3.4 |
| 1-n-Octene(a) | 17.6 | 7.2 | 2.5 |
| 4-Octene(b) | 2.7 | 5.4 | 0.5 |
| 3-Octene(b) | 1.9 | 2.2 | 0.8 |
| n-Octane(b) | 13.2 | 9.5 | 1.4 |
| trans-2-Octene(b) | 2.4 | 2.0 | 1.2 |
| Dimethylhexathiene(c) | 2.6 | 5.0 | 0.5 |
| cis-2-Octene | 1.3 | 0.8 | 1.7 |
| Dimethylcyclohexene(c) | 1.4 | 2.9 | 0.5 |
| Ethylbenzene | 0.4 | 0.7 | 0.5 |

(a)Partial isomerization may have occurred.
(b)Value includes associated GC peaks.
(c)Tentative identification.

EXAMPLE 7

Adsorption of 1-n-Decene and n-Decane from Their Mixture with Trimethylbenzenes

About 1.6 g of a 15% solution of 1-n-decene, n-decane, 1,2,4- and 1,2,3-trimethylbenzenes in heptamethylnonane was added to about 1 g acid/base washed silicalite of Example 1. The mixture was heated at 150° C. for 3 hours. A subsequent GC analysis of the supernatant liquid raffinate showed a major change in the composition of the model compounds, as shown by Table VI.

The data show a highly selective adsorption of both 1-n-decene and n-decane. A minor isomerization of 1-n-decene is indicated by the readily distinguished GC peaks of 4-decene and trans-2-decene. Based on the decreased concentrations of 1-n-decene and n-decane, the approximate capacity of the silicalite for these compounds together is 10.1%.

TABLE VI

Adsorption of a Mixture of C$_9$ and C$_{10}$ Model Compounds by an Acid/Base Washed Silicalite at 150° C. for 3 hours

| Name of Component | Comp., GC % | | Ratio, Feed to Raf. |
|---|---|---|---|
| | Feed | Raf. | |
| 1,2,4-Trimethylbenzene | 29.7 | 50.2 | 0.6 |
| 1-Decene | 22.1 | 0.9 | 24.5 |
| 4-Decene | | 0.1 | |
| n-Decane | 22.0 | 2.8 | 7.9 |
| trans-2-Decene | | 0.1 | |
| 1,2,3-Trimethylbenzene | 25.4 | 44.5 | 0.6 |

EXAMPLE 8

Adsorption of Isomeric n-Decenes from a Mixture of Model Compounds

About 2.7 g of a 1/1 mixture of C$_{10}$ model compounds and heptamethylnonane was added to a 1 g acid/base washed silicalite of Example 1. The resulting test mixture was then heated at 150° C. for 2 hours. The supernatant raffinate liquid was then analyzed by GC and its composition compared with that of the feed mixture. The results are shown by Table VII.

The data show that all the n-decenes are adsorbed in contrast to the trimethylbenzene components. However, it is not possible to determine the relative selectivities of their adsorption because of their concurrent isomerization. At a concentration comparable to those of n-decenes, 2,5-dimethylthiophene is adsorbed to a lesser degree, although it is clearly not rejected like the trimethylbenzenes.

TABLE VII

Adsorption of n-Decenes by an Acid-Base Washed Silicalite at 150° C. in 2 Hours

| Name of Component | Comp., GC % | | Ratio, Feed to Raf. |
|---|---|---|---|
| | Feed | Raf. | |
| 2,5-Dimethylthiophene | 10.7 | 11.8 | 0.9 |
| 1,2,4-Trimethylbenzene | 18.0 | 29.4 | 0.6 |
| 1-n-Decene | 11.3 | 5.7 | 2.0 |
| 4-Decene | 12.7 | 7.0 | 1.8 |
| 3-Decene | 3.0 | 2.4 | 1.3 |
| trans-2-Decene cis-2-Decene(a) | 12.0 | 8.5 | 1.4 |
| 1,2,3-Trimethylbenzene(a) | 26.6 | 33.5 | — |

(a)The two GC peaks are not completely resolved.

EXAMPLE 9

Adsorption of 1-n-Decene and n-Decane from a Mixture of C$_{10}$ Model Compounds by Various Silicalites About 1 g of each of an about 10/90 mixture of C$_{10}$ model compounds and heptamethylnonane was added to 1 g samples of various silicalites of Example 1. The resulting mixtures were heated at 150° C. for 2 hours and the raffinates analyzed by GC. The data are shown by Table VIII.

A comparison of the feed composition with those of the raffinates indicate that all the silicalites tested selectively adsorb 1-n-decene and n-decane. The untreated and acid/base washed silicalites were especially effective in adsorbing 1-n-decene. It is indicated by the low concentration of cis-2-decene in the raffinate, that no significant isomerization of 1-n-decene occurred. The concentration of indene in the raffinate of the mixture with the untreated silicalite is sharply reduced. This is probably due to acid catalyzed dimerization, oligomerization. The reduced concentrations of 2,5-dimethylthiophene indicate its selective adsorption by all the zeolites. It is noted that a selective 2,5-dimethylthiophene adsorption was not observed in the previous example where large amounts of 2,5-dimethylthiophene were employed. The bulkier sulfur compound, benzothiophene, was not adsorbed in either the present or the previous example.

TABLE VIII

Adsorption of $C_{10}$ Model Compounds by Various Silicalites

| Name of Component | Composition of Feed | Composition, GC % Silicalite at 120° C., 2 Hrs. | | | |
|---|---|---|---|---|---|
| | | Untreated | Acid/Base Treated | Silica Binder | Low Alumina Silicalite[a] |
| 2,5-Dimethylthiophene | 1.6 | | 0.2 | 0.4 | 0.1 |
| 1,3,5-Trimethylbenzene | 10.0 | 30.8 | 21.5 | 17.0 | 20.2 |
| 1,2,4-Trimethylbenzene | 9.9 | 26.0 | 18.7 | 16.5 | 19.9 |
| 1-n-Decene | 25.7 | | 0.4 | 12.4 | 8.2 |
| n-Decane | 27.9 | 12.1 | 7.9 | 18.3 | 7.7 |
| cis-2-Decene | 0.3 | 0.3 | 1.2 | 0.2 | 0.2 |
| Indane | 0.8 | 1.9 | 1.2 | 1.3 | 1.5 |
| Indene | 11.4 | 2.4 | 15.3 | 16.1 | 19.0 |
| Naphthalene | 8.0 | 22.0 | 16.9 | 13.8 | 18.7 |
| Benzothiophene | 2.0 | 3.6 | 3.3 | 3.2 | 4.2 |

[a] Less than 200 ppm alumina.

EXAMPLE 10

Adsorption of 1-n-Decene and n-Decane from $C_{10}$ FLEXICOKER Naphtha by Acid/Base Washed Silicalite About 1.9 g of a 10/90 mixture of a sharp $C_{10}$ FLEXICOKER naphtha fraction, of bp. 165 to 171° C., was added to 1 g acid/base washed silicalite of Example 1. The resulting test mixture was heated for 4 hours at 150° C. The feed and the supernatant raffinate liquid were then analyzed by GC. The gas chromatogram of the feed is shown by FIG. 1. The compositions of the feed and the raffinate are compared in Table IX.

The data of the table show that the concentration of the main 1-n-decene and n-decane components is drastically reduced on treatment with silicalite. This is apparently due to the selective adsorption of these components. As a consequence of the selective adsorption of the linear aliphatic compounds, the concentration of the aromatic components is generally increased.

TABLE IX

Adsorption of 1-n-Decene and n-Decane From a Sharp $C_{10}$ Fraction of FLEXICOKER Naphtha by Acid/Base Washed Silicalite

| Name of Compound | Concentration, GC % | | Ratio, Feed to Raf. |
|---|---|---|---|
| | Feed | Raf. | |
| 1-Methyl-3-ethylbenzene | 0.69 | 1.30 | 0.53 |
| 1-Methyl-4-ethylbenzene | 0.79 | 0.82 | 0.96 |
| 1,3,5-Trimethylbenzene | 1.90 | 3.71 | 0.51 |
| 1-Methyl-2-ethylbenzene | 2.32 | 4.15 | 0.56 |
| 1,2,4-Trimethylbenzene | 12.98 | 23.41 | 0.55 |
| 1-n-Decene | 23.17 | 0.92 | 25.18 |
| n-Decane | 14.86 | 3.57 | 4.16 |
| trans-2-Decene | 3.14 | 2.73 | 1.15 |
| 1,2,3-Trimethylbenzene | 7.41 | 12.82 | 0.58 |
| Indane | 2.96 | 5.52 | 0.54 |
| Indene | 0.85 | 0.90 | 0.94 |

EXAMPLE 11

Adsorption-Desorption of n-Decenes and n-Decane from $C_{10}$ FLEXICOKER Naphtha Fraction in a Pulse Test About 4.51 g acid base washed silicalite of Example 1, having a bed volume of 5 ml. was packed into a 1 ft. stainless steel column of a diameter of ¼ in. The resulting adsorbent bed was pre-wetted with n-hexane desorbent at a liquid hourly space velocity (LHSV) of 1.3, i.e., 6.5 ml per hour. After the desired operating conditions, i.e., 140° C. and 270 psi, were lined out, a 0.25 ml $C_{10}$ FLEXICOKER feed pulse, of the composition shown in the previous example, was injected into the column. After the injection, the flow of n-hexane desorbent was resumed and the feed components were eluted. Effluent samples were collected periodically and analyzed by GC. Their composition was plotted against the volume of the eluted desorbent, as shown by FIG. 2.

Figure 2:
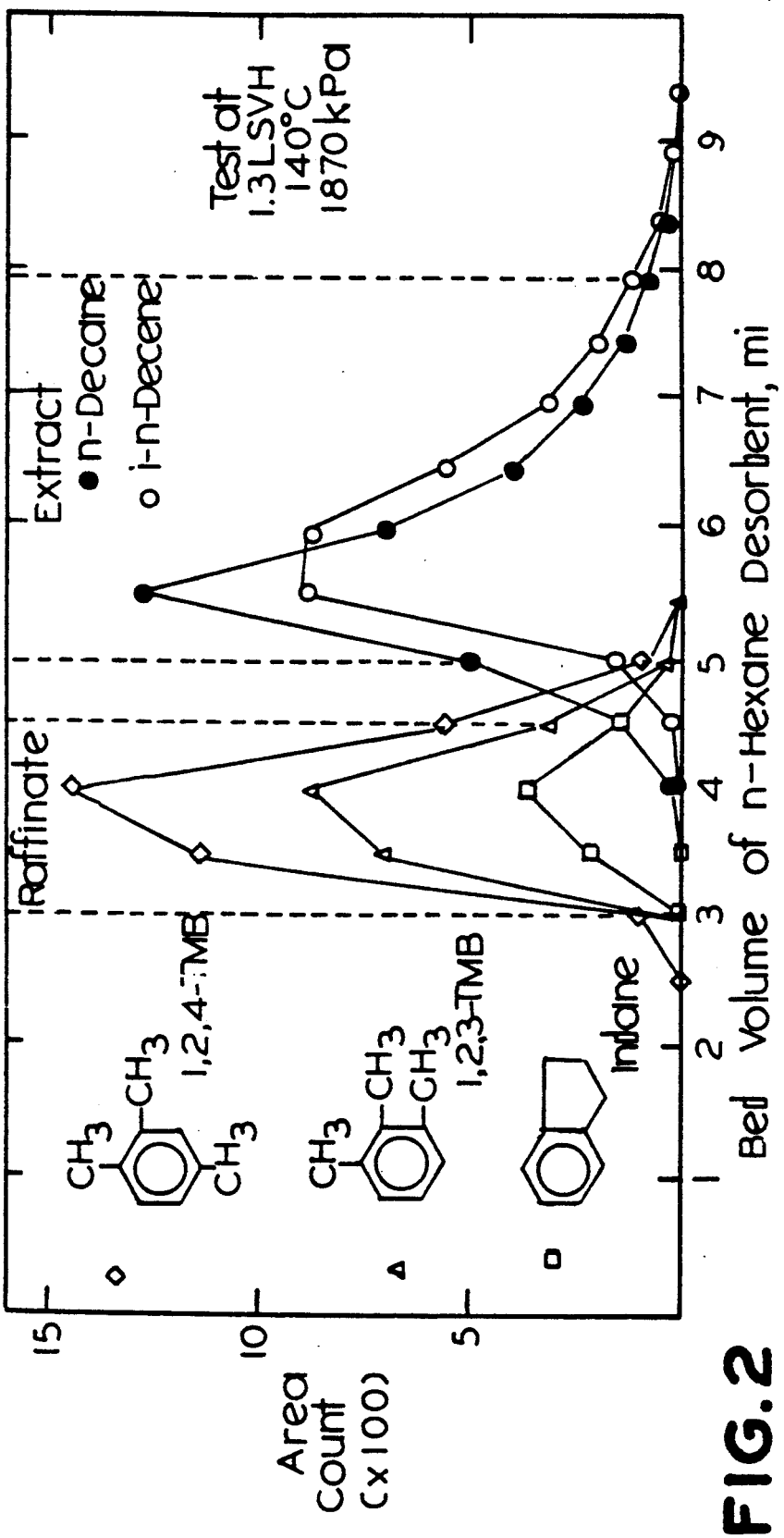
FIG. 2 illustrates the desorption, by n-hexane in a pulse test, of aromatic raffinate components and a 1-n-decene plus n-decane extract. This figure is discussed in detail in Example 11.

FIG. 2 indicates that the aromatic (and branched aliphatic) hydrocarbon components of the feed were eluted at first, due to their simple displacement by the desorbent from the voids of the silicalite column. This early fraction is the raffinate. Elution of the n-decane and 1-n-decene component rich extract occurred distinctly later. These components of the extract clearly coeluted, due to their concurrent displacement from the channels of the silicalite by the desorbent. The 1-n-decene was slightly more difficult to displace than the n-decane. As it is shown by the figure, an in-between-cut of the eluent was taken between the raffinate and the extract.

Both the raffinate and the extract were analyzed by GC in some detail. The analysis of the raffinate showed that essentially all the aromatic components of the feed were recovered. The results of the GC analysis of the extract are illustrated by FIG. 3.

Figure 3:
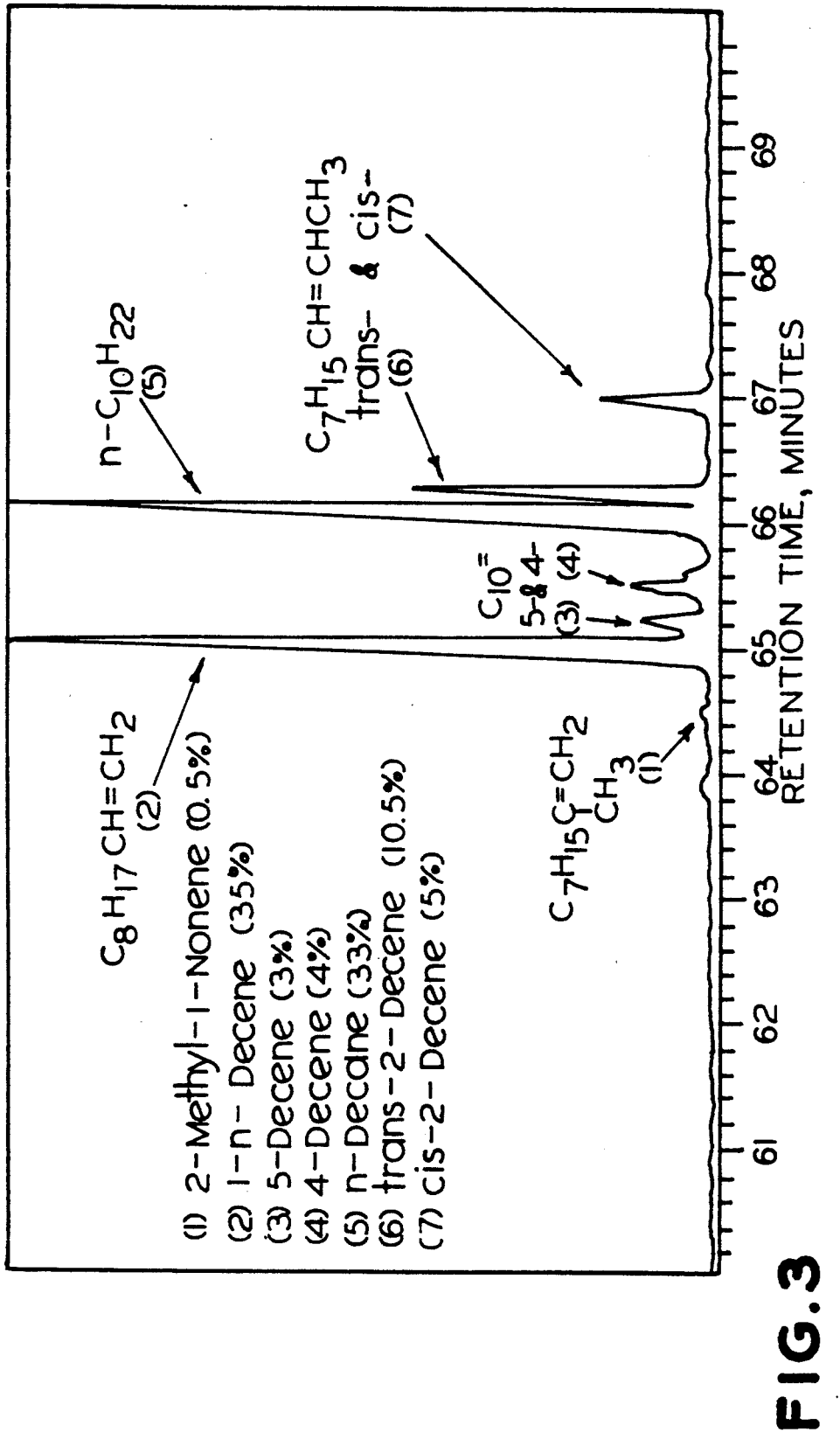
FIG. 3 illustrates the capillary gas chromatogram n-decenes plus n-decane extract of the $C_{10}$ FLEXICOKER distillate fraction, said extract having been obtained in the pulse test.

FIG. 3 shows that besides n-decane and 1-n-decene, significant amounts of internal linear decenes (5-,4- and 2-decenes) were recovered in the extract. The latter compounds were in part already present in the feed. Additional amounts were formed via 1-n-decene isomerization during the adsorption desorption process.

The chromatogram of the figure also indicated the presence in the extract of small amounts, about 0.5%, of 2-methyl-1-nonene. Some adsorption by the silicalite of this compound and the related 2-methylnonane was indicated by the model compound experiment described in Example 7.

EXAMPLE 12

Isomerization Testing of Treated Silicalites

To test the effectiveness of the acid-base treatment of the zeolite (see Example 1), 0.2 g of 1-hexene was added to a vial containing 1 g treated silicalite, the vial was crimp sealed, and placed in an oven for 1 hour at 100° C. The vial was removed from the oven, cooled to room ambient, and tested by the head space GC method. In this method, the composition of the gaseous phase above the silicalite, which is in equilibrium with the hexene(s) adsorbed in the silicalite, is measured.

This isomerization test is a very sensitive one because of the five linear hexene isomers, 1-hexene is the least stable one thermodynamically. The 100° C. environment is used to accelerate the isomerization reaction which may be slow under room ambient conditions.

If no isomerization takes place, the resulting chromatogram should display a single peak, that of 1-hexene. Conversely, if isomerization does occur, the resulting chromatogram should display a multiplicity of peaks, each peak representing a different hexene isomer. FIG. 4 is a representation of the results of such a test. The left hand side of the figure shows that untreated silicalite isomerizes 1-hexene, as represented by the four peaks, one for each linear 2-hexene and 3-hexene isomers. The right hand side of the figure, on the other hand, shows a single peak, that of 1-hexene, indicating that the acid-base treatment of the silicalite was effective in suppressing 1-hexene isomerization.

A summary of these test results is given in Table X, which indicates that untreated silicalite, which was included in these tests for comparison, as well as the acid washed silicalite, converted all of the 1-hexene into 2-hexene and 3-hexene isomers. These hexene isomers were identified from their respective GC peaks. The base washed silicalite showed considerable reduction ion isomerization activity; 92% of the 1-hexene remained intact.

TABLE X

| Summary of Isomerization Test Results on Silicalites | |
|---|---|
| Treatment | % 1-Hexene in Gas Phase |
| None (as received) | 0 |
| Acid Washed Only | 0 |
| Base Washed Only | 92 |
| Acid-Base Washed | 100 |

Under these test conditions, however, 8% of the gas phase above the solid was identified as being 2-hexene and 3-hexene isomers. The acid-base washed silicalite, on the other hand, showed that 100% of the gas phase above the solid was 1-hexene, as evidenced by a single peak on the chromatogram. This was compared to the chromatogram of 1-hexene which had not been contacted by silicalite; they were found to be identical.

Using ammonia instead of sodium hydroxide was equally effective suppressing 1-hexene isomerization. This is illustrated in FIG. 2, which shows the test results of a silicalite sample which had been acid washed, as described in Example 2 and treated with ammonia, as described in Example 1. The test results show that no isomers of 1-hexene were found, as evidenced by a single peak in the chromatogram.

A detailed analysis of the types and amounts of the various isomers formed when 1-hexene is contacted with untreated silicalite is given in Table XI. These data indicate that virtually all of the 1-hexene is transformed into 2-hexenes and 3-hexenes primarily and small amounts of varied $C_4$, $C_5$ and $C_6$ hydrocarbons.

TABLE XI

| Effect of Slicalite on 1-hexene | | |
|---|---|---|
| Species | 1-hexene (Reagent Grade) | 1-hexene over Silicalite |
| butenes | | .027 |
| pentenes | | .042 |
| 4-methyl, 1-pentene/ 3-methyl, 1-pentane | | .026 |
| 2-methyl pentane | .026 | .076 |

TABLE XI-continued

| Effect of Slicalite on 1-hexene | | |
|---|---|---|
| Species | 1-hexene (Reagent Grade) | 1-hexene over Silicalite |
| t-4-methyl, 2-pentene | | .028 |
| 3-methyl, pentane | .029 | .057 |
| 1-hexene | 99.61 | 2.617 |
| n-hexene | .096 | .093 |
| c- & t-3-hexene | .096 | 13.93 |
| t-2-hexene | | 53.77 |
| 2-methyl, 2-pentene | .236 | .025 |
| c-3-methyl, 2-pentene | | .027 |
| c-2-hexene | | 29.23 |
| t-3-methyl, 2-pentene | | .054 |

EXAMPLE 13

Adsorption of Hexenes from A Mixture of $C_6$ Compounds

About 0.2 g of a mixture of similar amounts of 1-hexene, t-2-hexene, c-2-hexene and 2-methyl-2-pentene was contacted with 1 g of acid-base treated silicalite at 40° C. for 15 minutes and then analyzed by head space GC. The results, given in Table XII, indicate that the linear hexenes are adsorbed preferentially to the branched olefin. This characteristic was observed for both the NaOH washed and $NH_3$ treated samples.

TABLE XII

| Silicalite Selectivity for Linear vs. Branched Olefins | | | | |
|---|---|---|---|---|
| | *Selectivity (αij) | | | |
| Sample | 2-methyl, 2-pentene | t-2-hexene | 1-hexene | c-2-hexene |
| Silicalite (Acid Washed, Base Washed) | .29 | 1.60 | 1.0 | .56 |
| Silicalite (Acid Washed, $NH_3$ Neutralized) | .27 | .93 | 1.0 | .71 |

*Head Space Technique, 40° C., Equimolar Adsorbed Phase.

EXAMPLE 14

Adsorption of Hexene from An Olefin-Aromatic Mixture

About 0.2 g of a mixture of similar amounts of 1-hexene and toluene was contacted with 1 g of acid-base treated silicalite at 40° for 15 min. and then analyzed by head space GC. The results, given in Table XIII, show that both the NaOH washed and $NH_3$ treated samples adsorbed 1-hexene in preference to toluene.

TABLE XIII

| Silicalite Selectivity for Linear Olefins vs. Aromatics | | |
|---|---|---|
| | *Selectivity (αij) | |
| Sample | 1-hexene | toluene |
| Silicalite (Acid Washed, Base Washed) | 1.0 | 0.042 |
| Silicalite (Acid Washed, $NH_3$ Neutralized) | 1.0 | 0.13 |

*Head Space Technique, 40° C., Equimolor Adsorbed Phase

What is claimed is:

1. A process for substantial separation of linear olefins and paraffins from mixtures containing at least linear and branched aliphatic hydrocarbons comprising:

contacting the mixture with a zeolite molecular sieve having a silica to alumina ratio of greater than about 50:1, internal pore diameters of at least 5.0Å, and which has been first treated with an acid in an amount sufficient to dissolve at least some of the acid soluble impurities in the zeolite and then treated with sufficient base to neutralize the acidic impurities whereby the sieve is substantially non-reactive toward olefin isomerization and oligomerization, the contacting being conducted under conditions sufficient to effect adsorption of linear olefins and linear paraffins by the zeolite to the substantial exclusion of branched aliphatic hydrocarbons whereby the linear olefins and paraffins are substantially separated from the mixture of aliphatic hydrocarbons.

2. The process of claim 1 wherein the zeolite has internal pore diameters of from about 5.5Å to about 6.0Å.

3. The process of claim 1 wherein the zeolite has a silica to alumina ratio greater than about 100:1.

4. The process of claim 1 wherein the contacting is carried out in the temperature range of from about 10° C. to about 250° C.

5. The process of claim 4 including the step of desorbing, under the desorption conditions, the zeolite after said contacting.

6. The process of claim 5 wherein said zeolite is contacted with steam, under desorption conditions, in desorbing the zeolite.

7. A method for rendering a high silica to alumina zeolite sieve substantially non-reactive toward olefin isomerization at temperatures ranging from about 10° C. to about 150° C., comprising:
washing a zeolite sieve having a silica to alumina ratio of greater than about 50:1 with an acid in an amount sufficient to dissolve at least some of the acid soluble impurities in the zeolite and then treating the acid washed zeolite with sufficient base to remove the acid impurities.

8. The method of claim 7 wherein the acid is aqueous hydrochloric acid and the base is aqueous sodium hydroxide.

9. The method of claim 7 wherein the acid is aqueous hydrochloric acid and the base is gaseous $NH_3$.

10. The method of claim 7 wherein the acid used is aqueous hydrochloric acid in an amount sufficient to remove substantially all the acid soluble impurities in the zeolite.

11. A zeolite composition having reduced acid sites prepared by:
washing a zeolite sieve having a silica to alumina ratio of greater than about 50:1 with an acid in an amount sufficient to dissolve at least some of the acid soluble impurities in the zeolite and then treating the acid washed zeolite with sufficient base to remove the acid impurities.

* * * * *